July 24, 1962 F. M. FLYNN 3,045,867
APPARATUS FOR SEPARATING A RESILIENT PLATE FROM A STACK THEREOF
Filed Dec. 6, 1957 2 Sheets-Sheet 1
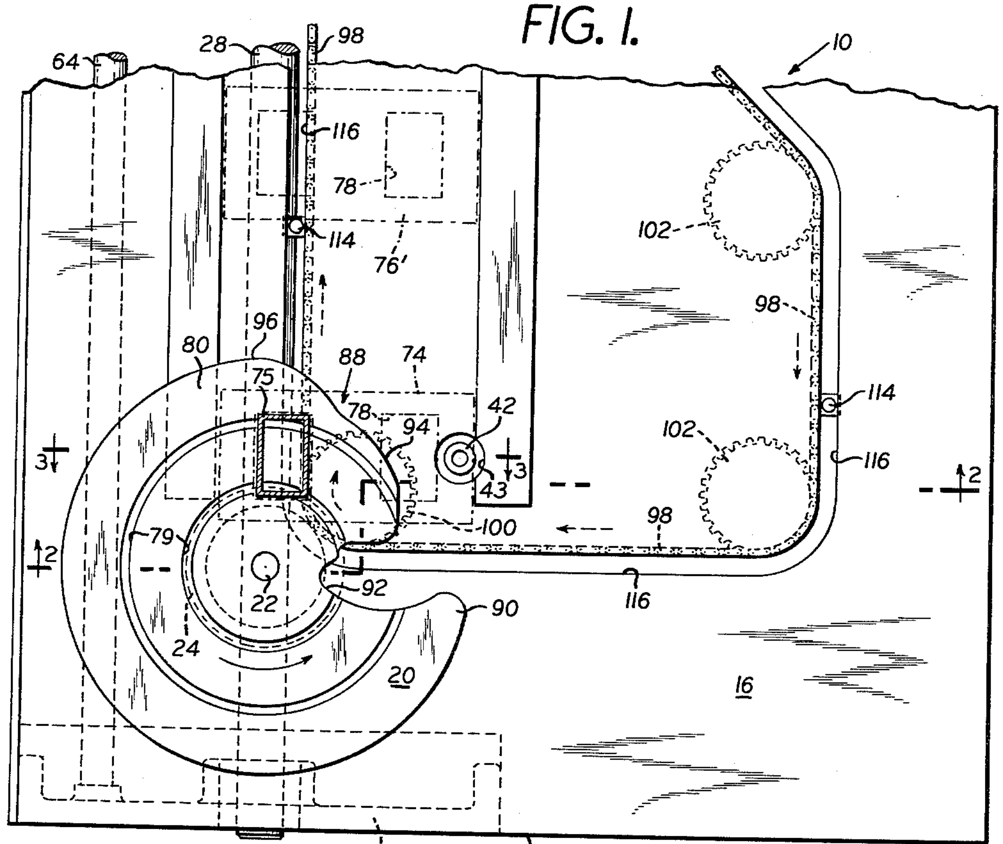
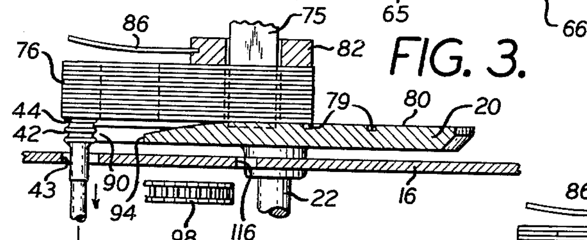
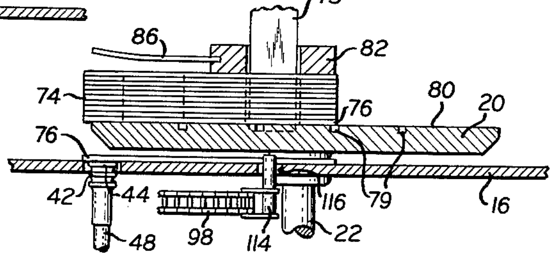
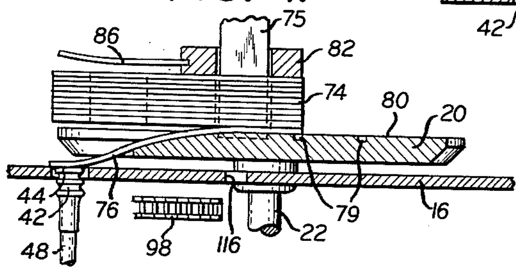
INVENTOR
FRANK M. FLYNN
BY
Hubbell and Cohen
ATTORNEYS.

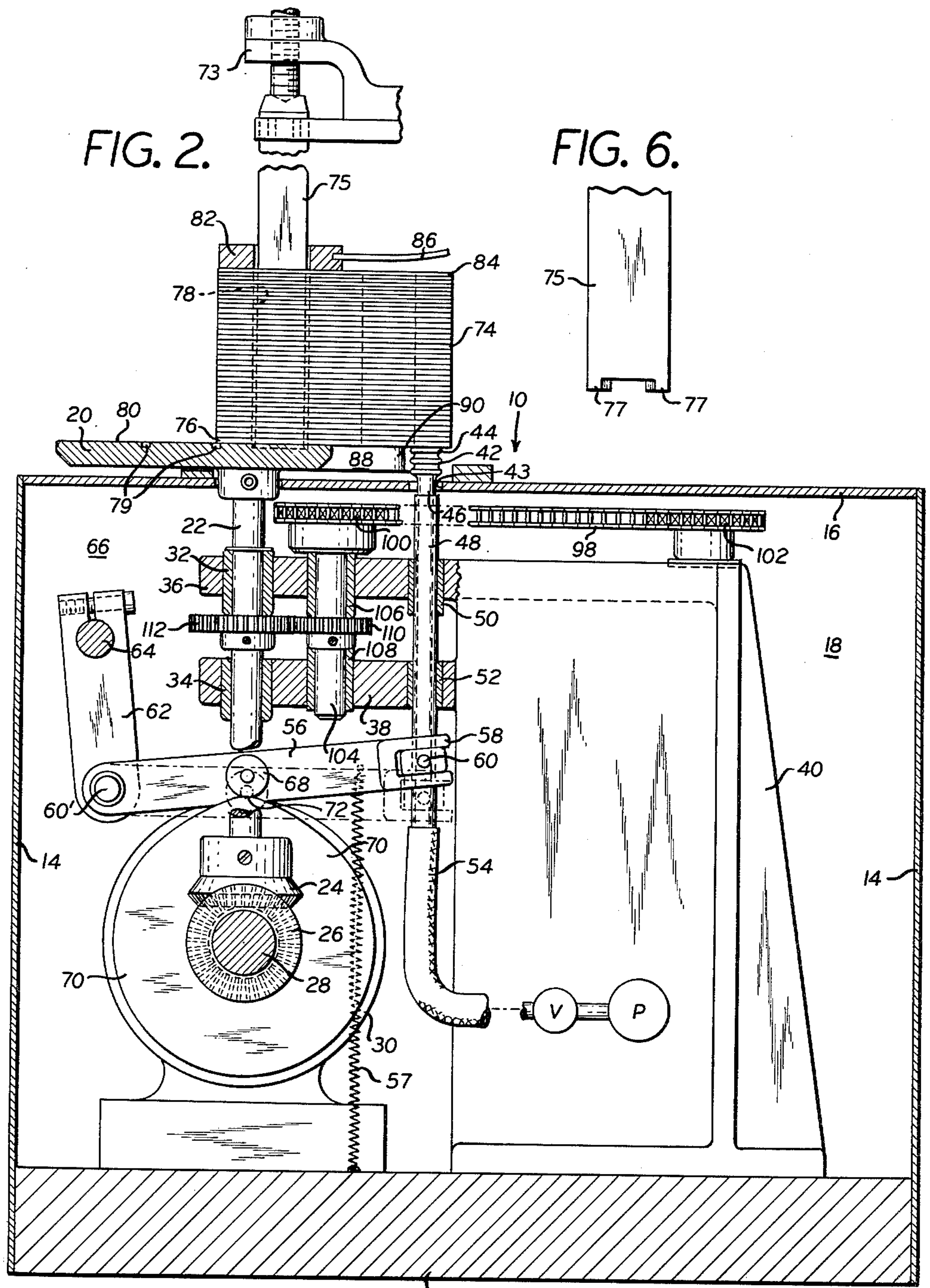
INVENTOR
FRANK M. FLYNN
BY
Hubbell and Cohen
ATTORNEYS.

3,045,867
Patented July 24, 1962

3,045,867

APPARATUS FOR SEPARATING A RESILIENT PLATE FROM A STACK THEREOF

Frank M. Flynn, Binghamton, N.Y., assignor to Seary Manufacturing Company, Endicott, N.Y., a partnership
Filed Dec. 6, 1957, Ser. No. 701,070
5 Claims. (Cl. 221—211)

This invention relates to means for separating the endmost resilient plate from a stack of similar plates and particularly to means for separating the bottommost transparency mount from a vertical stack of transparency mounts.

In numerous automatic machines there is required mechanism to perform the function of separating plate-like members, such as cards or the like, from a stack of such plate-like members. One type of machine in which this function must be performed is a machine for automatically mounting photographic transparencies in slide mounts. Slide mounts normally comprise a rectangular card having two spaced apertures and a center fold line. The card is made of cardboard although any similar thin and somewhat resilient material may be employed. In mounting a transparency in such a mount, the transparency, which has slightly larger peripheral extent than either of the two apertures, is indexed over one of the apertures. Then the transparency mount is folded and the two halves thereof are sealed together, preferably by a heat sealing process. One suitable transparency mount is shown and described in U.S. Patent No. 2,495,142, granted to Eugene G. Seary on January 17, 1950, and assigned to the assignee hereof. In automatic equipment for performing these functions, it is found preferable to feed transparency mounts to the equipment from a stack thereof. Accordingly, it is necessary to separate individual mounts from the stack and feed said individual mounts to other equipment in the automatic device.

One object of the present invention is to provide a new and improved device for separating an endmost resilient plate from a stack of similar plates.

Another object of the present invention is the provision of an automatic device for separating the bottommost resilient plate from a vertical stack of similar plates.

A more particular object of the present invention is the provision of a device for separating the bottommost transparency mount from a vertical stack of transparency mounts.

Still another object of the present invention is the provision of a device for separating the bottommost transparency mount from a vertical stack of similar transparency mounts and for then moving said bottommost transparency mount laterally of the stack.

The above and other objects, characteristics and features of the present invention will be more fully understood from the following description taken in connection with the accompanying illustrative drawings.

In the drawings:

FIG. 1 is a plan view of a device for separating a transparency mount from a stack thereof;

FIG. 2 is a vertical sectional view taken along the line 2—2 of FIG. 1;

FIG. 3 is a sectional view taken along the line 3—3 of FIG. 1, showing the apparatus in one condition during the separating action;

FIG. 4 is a sectional view similar to FIG. 3, showing the apparatus in a condition wherein the bottommost transparency mount has been partially separated from a vertical stack of similar transparency mounts;

FIG. 5 is a sectional view similar to FIG. 3, showing the condition of the apparatus when the bottommost transparency mount has been completely separated from the stack; and FIG. 6 is a side elevational view of a bar for aligning transparency mounts in a stack.

Referring now to the drawings in detail, the automatic device for separating individual transparency mounts from a stack thereof is generally designated by the reference numeral 10. This device comprises a base 12, vertical side walls 14 and a horizontal supporting surface 16 which between them define a chamber 18 in which various apparatus is disposed. Disposed above the top of horizontal supporting surface 16 is a rotating disc 20 which is fixed to a vertical shaft 22 which carries a bevel gear 24 at its opposite end. Bevel gear 24 is in meshed relation with a bevel gear 26 carried by the output shaft 28 of a motor 30. Motor 30 is here shown fixed to base 12. Shaft 22 is journaled in two spaced bearings 32 and 34 which are carried by horizontal bearing supports 36 and 38, respectively. Bearing supports 36 and 38 are in turn supported by a vertical structure 40. As shown herein, the two bearing support surfaces 36 and 38 are integrally formed with the structure 40 and the latter is in turn fixed to and supported by the base 12.

A suction device 42 is employed for grasping individual transparency mounts and for initially partially separating them from a stack. As shown herein, suction device 42 is in the form of a bellows which extends upwardly through surface 16 through an opening 43. This form of suction device is described and claimed in my co-pending U.S. patent application, Serial No. 689,434, filed by me an October 10, 1957, and assigned to the assignee hereof. As described in my aforementioned application, bellows 42 is collapsible in the vertical direction but is resistant to collapse in the horizontal direction. Accordingly, when the upper edge 44 of bellows 42 is in sealed engagement with the planar surface of a transparency mount and negative pressure is supplied to the bellows through its opposite end 46 as will be described hereinafter, bellows 42 will collapse in the longitudinal or vertical direction but will resist collapse in the transverse or horizontal direction. Horizontal collapse would result in a cutting off of the negative pressure supplied to the end 44 which in turn would result in a releasing of the engaged transparency mount. Moreover, for reasons to be pointed out hereinafter, bellows 42 is bendable away from its normal longitudinal axis. If a more detailed description of the suction device is desired, reference may be had to my a forementioned application. Suction device 42 is connected to a tube 48 which is slidably mounted in bearings 50 and 52 carried by bearing supports 36 and 38, respectively. The lower end of tube 48 is connected to a flexible hose 54 which is adapted to be connected to a negative pressure device, such as an exhaust pump P, preferably through an intermittently operable valve V. As was described hereinbefore, when negative pressure is applied to bellows 42 with the upper edge of the bellows in sealed relation with a transparency mount, the bellows will collapse in a vertical direction thereby imparting vertical movement to the upper end 44. While for some applications, the vertical movement resulting from the vertical collapse of the bellows 42 will suffice to effect a partial separation of a transparency mount from a stack, in the present invention it is preferred to supply additional vertical movement to said stack. This additional movement is supplied by a reciprocating lever 56 which is connected to a tube 48 by means of a sleeve 58 which surrounds a pin 60 connected to tube 48. Lever 56 is pivotally mounted as at 60' on a link 62 which is in turn further pivotally mounted on a stud 64 carried by fixtures 65 supported by base 12 and side walls 66 of the bottom enclosure. A spring 57 connected to lever 56 biases a cam follower 68 which is rotatably mounted on lever 56 into engagement with a cam 70 carried by the output shaft 28 of motor 30. Cam 70 is substantially circular but has a high point 72 which for a short time during a complete revolution of the cam moves the lever 56 upwardly to thereby in turn move the tube 48 upwardly; and after a short time the high point 72 moves out of engagement with the cam follower 68 to permit the dropping of the described elements. As will be shown hereinafter, the vertical reciprocating movement of the bellows 42 is in timed relation with the rotation of disc 20.

Supported by the upper surface of the disc 20 is a stack 74 of transparency mounts of the type hereinbefore described. To maintain the stack 74 in vertical alignment, a rectangular bar 75 extends vertically down through one of the rectangular apertures 78 of the stack of transparency mounts. Bar 75 is preferably releasably held adjacent the top thereof in any suitable manner such as by clamp 73, and is accurately indexed relative to disc 20 by any suitable means such as index pins 77 and slots 81. This insures for proper positioning of the stack 74 relative to disc 20 and bellows 42. To bias the stack 74 downwardly so that the bottommost mount 76 is resting on the upper surface 80 of the disc 20, a weight 82 having an aperture slightly larger than the cross section of bar 75 surrounds said bar and bears against the uppermost mount 84 of the stack. Weight 82 preferably carries a spring 86 which extends outwardly from the weight and is adapted to limit the upward movement of the uppermost mount 84 to insure engagement of bellows 42 with the lowermost mount 76. In operation, spring 86 will not engage the uppermost mount 84 when the stack is of substantial size as the weight of the stack will be sufficient to resist the upward force exerted against the lowermost mount 76. Moreover, with a substantial stack if the spring did engage the uppermost mount 84 with any substantial force, it might well cause more than one mount to be separated from the stack at a given time. However, when the stack is substantially depleted so that there is not sufficient weight bearing on the lowermost mount 76 to resist the upward force exerted against the stack by the bellows as it moves into engaging relation with the lowermost mount 76, the stack will tend to move up and this upward movement is limited by spring 86 to insure that the lowermost mount will be held in a position where a seal can be effected between the bellows and the lowermost mount 76.

Bar 75 is preferably tapered at the top as shown in FIG. 2, in order to facilitate easy insertion of the bar through the rectangular apertures 78 in the stack of transparency mounts 74. Moreover, the bottom of bar 75 is provided with two vertical extensions 77 which are adapted to fit into two spaced annular grooves 79 in the upper surface 80 of disc 20 so as to prevent the lowermost mount 76 from being dragged out from under the stack by the rotation of disc 20. Moreover, if desired, bar 75 may be supported by disc 20 to facilitate loading of photomounts without the removal of the bar from the machine. If such a construction were employed, bar 75 could be conditioned for loading merely by unclamping clamp 73. However, as shown, bar 75 must be removed in order to load photomounts thereon.

Disc 20 is of a particular peripheral configuration. Essentially, the disc 20 is circular but is provided with a cut-out portion 88 in the periphery thereof. This cut-out portion is shaped so that there is a finger 90 extending in the direction of rotation of the disc 20. Immediately adjacent finger 90 is a deep cut-out portion 92. The cut-out portion 92 is of relatively small peripheral extent and immediately adjacent thereto is a long relatively shallow cut-out portion 94 which extends between the deep cut-out portion 92 and the trailing end 96 of the circular periphery of the disc. The upper surface 80 slopes downwardly as it approaches the periphery of shallow cut-out portion 94. The purpose of this sloping surface contour will become clear as this description progresses. As will be shown hereinafter, vertical movement of the bellows 42 is in such a timed relation with rotation of the disc 20 that the upper edge 44 of the bellows 42 is disposed above the upper surface of the disc 20 only when the shallow cut-out portion 94 registers with the bellows. At other times the upper edge 44 of the bellows 42 is disposed below the lower surface of the disc 20 and, in fact, the disc overlies at least a portion of said bellows at times when the circular periphery of the disc 20 is in registry with the bellows.

The operation of the mechanism described above is as follows: The initial condition is shown in FIG. 3. In this condition disc 20 is supporting substantially the entire lower surface of the bottommost transparency mount 76. The bellows 42 is in its extended condition with the upper edge 44 disposed in engagement with the bottom surface of the lowermost mount 76. This disposition of the bellows 44 is a result of the fact that cam follower 68 is in engagement with the raised portion 72 of the cam 70 and valve V is closed to cut off the supply of negative pressure to the bellows. Due to the flexibility of bellows 42, upper edge 44 will align itself in sealing relation with the lower surface of the lowest transparency mount. At this point valve V is opened to supply negative pressure to the bellows 42 through the flexible hose 54 and tube 48 to complete the seal between the upper edge 44 of the bellows and the lower surface of the lowest transparency mount 76. Moreover, the negative pressure will cause the vertical collapse of bellows 42 to thus move the left hand portion of mount 76 downward as viewed in FIGS. 3–5. Rotation of shaft 28 naturally is continuous and after a brief interval during which the aforementioned seal is effected, raised portion 72 of cam 70 will move out of engagement with cam follower 68 which will permit lever 56 to move downwardly under the urging of spring 57. This downward movement will complete the movement of bellows 42 downwardly to the position shown in FIG. 4. Since there is a sealing relation between the upper edge 44 of bellows 42 and the bottommost transparency mount 76, the end of the transparency mount which is in engagement with upper edge 44 of the bellows will move downwardly with said upper edge as shown in FIG. 4. This will dispose the left hand edge of the transparency mount as viewed in FIG. 4 in a plane below the lower surface of disc 20 to thereby partially separate mount 76 from the stack 74. With the apparatus in this condition, the left hand portion of mount 76 overlies the tapered upper surface portion of disc 20, and the extreme left hand end rests on surface 16. If the tapered surface were not provided, it would be practically impossible to achieve the partially separated condition shown in FIG. 4 as the mount 76 would be irreparably damaged if it were bent around an untapered surface. Moreover, the shallow cut-out portion 94 provides access for the left hand end of photomount 76 to supporting surface 16 to enable the left hand end of said mount as viewed in FIG. 4 to engage said surface 16 when drawn downwardly by bellows 42. At this point finger 90 of disc 20 moves between the left hand end of mount 76 and the left hand end of the mount immediately thereabove as viewed in FIG. 4.

Continued rotation of the disc 20 in a counter-clockwise direction as viewed in FIG. 1 moves the finger 90 and the portions of the disc 20 immediately therebehind between mount 76 and the mount immediately thereabove. This movement will effect a peeling of the lowest mount 76 off of the stack 74 until finally all of the disc 20 moves out of supporting relation with the entire surface of lowest mount 76 to permit it to drop or snap against the supporting surface 16. However, at the time that this dropping or snapping occurs, disc 20 will be in supporting relation with the mount immediately above mount 76 which now becomes the new lowermost mount in the stack. This condition is illustrated in FIG. 5. It is to be noted that the disc 20 moves out of supporting relation with the lowermost mount 76 at the point when the deep cut 92 registers with the lower left hand corner of the mount stack 74 as viewed in FIG. 1. Thereafter, disc 20 continues rotating in supporting relation with the new lowermost mount until cut-out portion 94 again moves into registry with bellows 42 at which point the cycle is repeated. Intermittently operable valve V is again closed after complete separation of mount 76 is effected so as to break the seal between the bellows and the separated mount to free said mount for movement transversely of the stack out from under the stack.

It will be noted that as the bottommost photomount 76 is peeled away from the stack by disc 20, the portion thereof which is in sealing relation with the top 44 of bellows 42 passes through a number of different poses in which the portion is oriented at varying angles to the horizontal. Such movement of mount 76 might well break the seal between the mount and the bellows. However, as was pointed out hereinbefore, bellows 42 is deformable or bendable away from its longitudinal (vertical) axis. Accordingly, as the portion of mount 76 in engagement with bellows 42 moves into different angular relation with the horizontal, bellows 42 bends in order to keep the edge 44 coplanar with the engaged portion of mount 76. This obviates the possibility of the seal between the bellows and the mount being broken and assures a proper removal of the mount as has been described hereinbefore.

The transverse movement of the separated mount 76 may be effected in any desirable manner. The manner which is presently preferred is shown in the drawings and will be described below. To effect the transverse movement of the separated mount, an endless chain 98 is employed. Chain 98 is carried by a drive sprocket 100 and several idler sprockets 102, two of which are shown in FIG. 1. Drive sprocket 100 is mounted on a vertical shaft 104 which is journaled in bearings 106 and 108 which in turn are carried by bearing supports 36 and 38, respectively. Fixed to shaft 104 is a spur gear 110 which is in meshed relation with a spur gear 112 fixed to shaft 22. Accordingly, chain 98 will move continuously in timed relation with disc 20.

Carried by chain 98 are one or more studs 114 which stand upright or in a vertical direction and extend through a slot 116 in horizontal support surface 16 to a point above said surface. The movement of chain 98 is so timed with respect to the other apparatus described hereinbefore that each time a mount 76 is completely separated from the stack 74 and is disposed on the horizontal supporting surface 16, a stud 114 moves into engagement with the separated mount 76 to move it transversely in a horizontal direction out from under the stack as is shown in FIG. 1 with regard to a separated mount 76'. In this manner the apparatus is conditioned for the sequential separation of each of the lowermost mounts in the stack 74.

While the machine as described operates with a vertical stack of photomounts, it will be understood that the same machine can be used to operate with a horizontal stack of photomounts or a stack of photomounts disposed in any other plane. Of course, disc 20 must be oriented in a plane perpendicular to the axis of the stack 74. Moreover, when the stack is out of the vertical so that the bias of gravity cannot be relied upon, a suitable spring bias must be provided to insure the constant movement of the stack toward the disc. This, of course, can be readily arranged by utilizing either tension or compression springs as desired. However, nothing herein shall be construed as restricting the invention to use solely with a vertical stack.

While I have herein shown and described one form of the present invention, it will be understood that various changes and modifications may be made therein within the scope of the appended claims without departing from the spirit and scope of this invention.

Having now described my invention, what I claim as new and desire to secure by Letters Patent, is:

1. A device for separating the bottommost resilient plate from a vertical stack of horizontal resilient plates, comprising a rotatable disc engaging said bottommost plate to provide exclusive support for said stack, means for rotating said disc, said disc being substantially circular but being provided with a cut-out portion in the periphery thereof, a suction device having an end reciprocably movable in a vertical direction to and from a first position below said disc and to and from a second position above said disc, said end of said suction device engaging an end of the bottom surface of said bottommost plate in sealing relation when said end of said suction device is in said second position, means for moving said end of said suction device in timed relation with the rotation of said disc so that said end of said suction device occupies said second position only when said cut-out portion of said periphery of said disc registers therewith, said last mentioned moving means being effective to move said end of said suction device to said first position prior to said cut-out portion of said periphery of said disc moving out of registry with said end of said suction device to carry said end of said bottommost plate therewith to a plane below said disc, continued rotation of said disc being effective to move said disc between said bottommost plate and the plate immediately thereabove, whereby to complete the separation of said bottommost plate from said stack.

2. A device for separating the bottommost resilient plate from a vertical stack of horizontal resilient plates, comprising a rotatable disc engaging said bottommost plate to provide exclusive support for said stack, means for rotating said disc, said disc being substantially circular but being provided with a cut-out portion in the periphery thereof, a suction device including a bellows having an upper end engageable with the bottom surface of said bottommost plate in sealing relation therewith and a lower end adapted to be connected to an intermittently operable negative pressure device, said bellows being collapsible in a longitudinal direction and resistant to collapse in a transverse direction and being resiliently deformable away from the longitudinal axis thereof, said first mentioned end of said bellows being reciprocably movable in a vertical direction to and from a first position below said disc and to and from a second position above said disc, said first mentioned end of said suction device engaging an end of the bottom surface of said bottommost plate in sealing relation therewith when said end of said suction device is in said second position, means for moving said end of said suction device in timed relation with the rotation of said disc so that said first mentioned end of said suction device occupies said second position only when said cut-out portion of said periphery of said disc registers therewith, said last mentioned moving means being effective to move said first mentioned end of said suction device to said first position prior to said cut-out portion of said periphery of said disc moving out of registry with said end of said suction device to carry said end of said bottommost plate therewith to a plane below said disc, said cut-out portion being formed so that a part of said disc is adapted to move between said end of said bottommost plate and the corresponding end of the plate immediately thereabove and then the remainder of said disc moves out from under said bottommost plate to remove said disc from supporting relation with said bottommost plate to thereby permit it to move below said disc while engaging said plate immediately thereabove to prevent said last mentioned plate from moving below said disc, whereby to complete the separation of said bottommost plate from said stack.

3. A device for separating the bottommost resilient plate from a vertical stack of horizontal resilient plates, comprising a rotatable disc adapted to provide exclusive support for said stack by engagement with said bottommost plate, means for rotating said disc, said disc being substantially circular but being provided with a relatively shallow cut-out portion and a relatively deep cut-out portion in the periphery thereof, said deep cut-out portion defining a finger extending in the direction of rotation of said disc, a suction device having an end reciprocably movable in a vertical direction to and from a first position below said disc and to and from a second position above said disc, said end of said suction device being adapted to engage an end of the bottom surface of said bottommost plate in sealing relation when said end of said suction device is in said second position, means for moving said end of said suction device in timed relation with the rotation of said disc so that said end of said suction devices occupies said second position only when said shallow cut-out portion of said periphery of said disc registers therewith, said end of said suction device moving to said first position prior to said shallow cut-out portion of said periphery of said disc moving out of registry with said end of said suction device whereby to adapt said suction device to carry said end of said bottommost plate therewith to a plane below said disc, continued rotation of said disc being adapted to be effective to move said finger between said bottommost plate and the plate immediately thereabove, and further rotation of said disc being effective for removing said disc from supporting relation with said bottommost plate while remaining in supporting relation with the plate immediately thereabove, whereby to complete the separation of said bottommost plate from said stack.

4. A device for separating the bottommost resilient plate from a vertical stack of horizontal resilient plates, comprising a rotatable disc adapted to provide exclusive support for said stack by engagement with said bottommost plate, means for rotating said disc, said disc being substantially circular but being provided with a relatively shallow cut-out portion and a relatively deep cut-out portion in the periphery thereof, the thickness of said disc being tapered adjacent said relatively shallow cut-out portion, said deep cut-out portion defining a finger extending in the direction of rotation of said disc, a suction device having an end reciprocably movable in a vertical direction to and from a first position below said disc and to and from a second position above said disc, said end of said suction device being adapted to engage an end of the bottom surface of said bottommost plate in sealing relation when said end of said suction device is in said second position, means for moving said end of said suction device in timed relation with the rotation of said disc so that said end of said suction device occupies said second position only when said shallow cut-out portion of said periphery of said disc registers therewith, said end of said suction device moving to said first position prior to said shallow cut-out portion of said periphery of said disc moving out of registry with said end of said suction device whereby to adapt said suction device to carry said end of said bottommost plate therewith to a plane below said disc, continued rotation of said disc being adapted to be effective to move said finger between said bottommost plate and the plate immediately thereabove, and further rotation of said disc being effective for removing said disc from supporting relation with said bottommost plate while remaining in supporting relation with the plate immediately thereabove, whereby to complete the separation of said bottommost plate from said stack.

5. A device for separating the bottommost resilient plate from a vertical stack of horizontal resilient plates, comprising a rotatable disc adapted to provide exclusive support for said stack by engagement with said bottommost plate, means for rotating said disc, said disc being substantially circular but being provided with a relatively shallow cut-out portion and a relatively deep cut-out portion in the periphery thereof, the thickness of said disc being tapered adjacent said relatively shallow cut-out portion, said deep cut-out portion defining a finger extending in the direction of rotation of said disc, a suction device having an end reciprocably movable in a vertical direction to and from a first position below said disc and to and from a second position above said disc, said end of said suction device being adapted to engage an end of the bottom surface of said bottommost plate in sealing relation when said end of said suction device is in said second position, means for moving said end of said suction device in timed relation with the rotation of said disc so that said end of said suction device occupies said second position only when said shallow cut-out portion of said periphery of said disc registers therewith, said end of said suction device moving to said first position prior to said shallow cut-out portion of said periphery of said disc moving out of registry with said end of said suction device whereby to adapt said suction device to carry said end of said bottommost plate therewith to a plane below said disc, continued rotation of said disc being adapted to be effective to move said finger between said bottommost plate and the plate immediately thereabove, and further rotation of said disc being effective for removing said disc from supporting relation with said bottommost plate while remaining in supporting relation with the plate immediately thereabove, whereby to complete the separation of said bottommost plate from said stack, and a continuous chain disposed in a horizontal plane and having a vertically extending stud fixed thereto, said stud beig adapted to engage a separated plate, and means for moving said chain in timed relation with the rotation of said disc and the movement of said bellows for moving said stud into engagement with said separated plate to move the latter horizontally out from under said stack.

References Cited in the file of this patent

UNITED STATES PATENTS

| | | |
|---|---|---|
| 1,794,198 | Murray | Feb. 24, 1931 |
| 1,809,262 | Aicher | June 9, 1931 |
| 2,799,497 | Novick | July 16, 1957 |
| 2,903,156 | Eddison | Sept. 8, 1959 |

FOREIGN PATENTS

| | | |
|---|---|---|
| 102,439 | Switzerland | Dec. 1, 1923 |
| 276,374 | Germany | July 10, 1914 |
| 731,864 | France | June 6, 1932 |